(12) United States Patent
Zhu et al.

(10) Patent No.: US 12,547,416 B2
(45) Date of Patent: Feb. 10, 2026

(54) KERNEL REBOOT METHOD

(71) Applicant: HUAWEI TECHNOLOGIES CO., LTD., Guangdong (CN)

(72) Inventors: Ling Zhu, Beijing (CN); Yan Sang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 318 days.

(21) Appl. No.: 18/157,967

(22) Filed: Jan. 23, 2023

(65) Prior Publication Data

US 2023/0161600 A1 May 25, 2023

Related U.S. Application Data

(63) Continuation of application No. PCT/CN2021/102291, filed on Jun. 25, 2021.

(30) Foreign Application Priority Data

Jul. 29, 2020 (CN) .......................... 202010749138.7

(51) Int. Cl.
*G06F 9/4401* (2018.01)
*G06F 9/48* (2006.01)

(52) U.S. Cl.
CPC .......... *G06F 9/4406* (2013.01); *G06F 9/4418* (2013.01); *G06F 9/4812* (2013.01)

(58) Field of Classification Search
None
See application file for complete search history.

(56) References Cited

U.S. PATENT DOCUMENTS

| 8,200,934 | B2 * | 6/2012 | Kasahara | G06F 15/167 |
| | | | | 711/167 |
| 9,411,646 | B2 * | 8/2016 | Lei | G06F 9/4405 |
| 2017/0010879 | A1 * | 1/2017 | Ashank | G06F 9/542 |

FOREIGN PATENT DOCUMENTS

| CN | 101901159 A | 12/2010 |
| CN | 102331947 A | 1/2012 |
| CN | 102929747 A | 2/2013 |

* cited by examiner

*Primary Examiner* — Kim Huynh
(74) *Attorney, Agent, or Firm* — WOMBLE BOND DICKINSON (US) LLP (57) ABSTRACT

This application provides a kernel reboot method, to reserve an internal memory for storing an entry address of a physical code and a code segment for the physical core. A kernel hotswap scenario is used as an example. When a computer system stops executing an old kernel, an interrupt is sent to the physical core, so that the physical core enters a busy waiting state. When the computer system starts a new kernel, the entry address of the physical core is modified. When finding that the entry address is modified, the physical core in the busy waiting state exits the busy waiting state, performs an initialization procedure of the physical core, and receives task scheduling of the new kernel.

15 Claims, 5 Drawing Sheets

KERNEL REBOOT METHOD

CROSS-REFERENCE TO RELATED APPLICATIONS

This application is a continuation of International Application No. PCT/CN2021/102291, filed on Jun. 25, 2021, which claims priority to Chinese Patent Application No. 202010749138.7, filed on Jul. 29, 2020. The disclosures of the aforementioned applications are hereby incorporated by reference in their entireties.

TECHNICAL FIELD

This application relates to the field of operating systems, and specifically, to a kernel reboot method.

BACKGROUND

A modern computer system includes a hardware layer and a software layer from a macro perspective. The hardware layer may include one or more processors, memories, and input/output devices. The software layer includes an operating system and an application program. The operating system is a computer program that manages and controls computer software and hardware resources, and is basic system software running on a physical machine. The application program can run only when supported by the operating system. When the physical machine is rebooted or a kernel version of the operating system is updated, if a time required to reboot the computer system is excessively long, user experience of a user is relatively poor.

A time required to boot the computer system mainly includes three parts: a time required to boot system firmware (for example, a basic input/output system (BIOS)), a time required for hardware initialization, and a time required for kernel reboot. The time for hardware initialization and the time for booting the system firmware account for most of the time. Kexec (kernel execution) is a mechanism of a Linux kernel, used to boot from a currently running old kernel to a new kernel and boot the new kernel to complete kernel version update. Kexec skips the phase of booting the system firmware and the phase of hardware initialization, and directly loads the new kernel into an internal memory and starts executing the new kernel, thereby shortening the boot time of the computer system. Although kexec can skip the two time-consuming phases of booting the system firmware and hardware initialization, it is found in a debugging process that a process of powering off and then powering on a physical core is quite time-consuming in a process of updating a kernel version.

SUMMARY

This application provides a kernel reboot method, to shorten a time required for kernel reboot, and improve user experience.

According to a first aspect, this application provides a kernel reboot method. The method includes: receiving a request to stop executing a kernel; setting a state of a physical core to a busy waiting state; querying, by the physical core in the busy waiting state, whether an entry address of the physical core is modified; setting, after it is determined that the entry address of the physical core is modified, the state of the physical core to exit the busy waiting state; and performing an initialization procedure of the physical core.

The physical core in the busy waiting state is in a no-load state and does not receive any task delivered by a kernel. When the physical core in the busy waiting state finds that the entry address is modified, the physical core exits the busy waiting state, performs the initialization procedure of the physical core, and then receives task scheduling of a new kernel. In the entire process, the physical core is in a power-on state. Compared with a conventional technology in which the physical core needs to be powered off and then powered on, the method provided in this embodiment of this application can reduce a time required for kernel reboot, thereby improving user experience of a computer system user.

In an embodiment, there are a plurality of physical cores, and setting a state of a physical core to a busy waiting state includes: simultaneously sending an interrupt to one or more physical cores in a processor in response to the received request; and setting the state of the physical core to the busy waiting state in response to the received interrupt. Busy waiting is a state in a kernel lock.

In an embodiment, there are a plurality of physical cores, and each of the one or more physical cores has a corresponding internal memory space for storing an entry address of the physical core.

In an embodiment, a code segment is further stored in the internal memory space corresponding to each physical core, and the querying, by the physical core in the busy waiting state, whether an entry address of the physical core is modified includes: invoking, by the physical core, an instruction in the code segment, to query whether the entry address of the physical core is modified.

In an embodiment, the method further includes: in response to the kernel being booted, modifying the entry address of the physical core and the code segment in the internal memory space, where a modified entry address is a start address of a modified code segment, and an instruction of the modified code segment is invoked by the physical core to perform the initialization procedure of the physical core.

In an embodiment, setting, after it is determined that the entry address of the physical core is modified, the state of the physical core to exit the busy waiting state includes:
   determining that the entry address of the physical core is modified, and jumping to executing a code segment corresponding to a modified entry address, where the modified entry address is a start address of the code segment corresponding to the modified entry address, and an instruction of the code segment corresponding to the modified entry address is invoked by the physical core to perform the initialization procedure of the physical core.

According to a second aspect, this application provides a kernel reboot apparatus. The apparatus includes:
   a receiving unit, configured to receive a request to stop executing a kernel; and
   a processing unit, configured to set a state of a physical core to a busy waiting state; query whether an entry address of the physical core is modified; set, after it is determined that the entry address of the physical core is modified, the state of the physical core to exit the busy waiting state; and perform an initialization procedure of the physical core. The processing unit may specifically instruct the physical core in the busy waiting state to query whether the entry address of the physical core is modified.

In an embodiment, there are a plurality of physical cores, and the processing unit is specifically configured to: simultaneously send an interrupt to one or more physical cores in a processor in response to the received request; and set the state of the physical core to the busy waiting state in response to the received interrupt.

In an embodiment, there are a plurality of physical cores, and each of the one or more physical cores has a corresponding internal memory space for storing an entry address of the physical core.

In an embodiment, a code segment is further stored in the internal memory space corresponding to each physical core, and the processing unit is specifically configured to invoke an instruction in the code segment, to query whether the entry address of the physical core is modified.

In an embodiment, the apparatus further includes a modification unit, configured to: in response to the kernel being booted, modify the entry address of the physical core and the code segment in the internal memory space, where a modified entry address is a start address of a modified code segment, and an instruction of the modified code segment is invoked by the physical core to perform the initialization procedure of the physical core.

In an embodiment, the processing unit is specifically configured to: determine that the entry address of the physical core is modified, and jump to executing a code segment corresponding to a modified entry address, where the modified entry address is a start address of the code segment corresponding to the modified entry address, and an instruction of the code segment corresponding to the modified entry address is invoked by the physical core to perform the initialization procedure of the physical core.

According to a third aspect, this application provides a computer system. The computer system includes a processor and a memory, the memory stores computer instructions, and the processor executes the computer instructions to perform the method described in any one of the first aspect and the embodiments of the first aspect.

According to a fourth aspect, this application provides a computer-readable storage medium. The computer-readable storage medium stores computer instructions, and a processor executes the computer instructions to perform the method described in any one of the first aspect and the embodiments of the first aspect.

According to a fifth aspect, this application provides a computer program product. The computer program product includes computer instructions, and the computer instructions are invoked by a processor to perform the method described in any one of the first aspect and the embodiments of the first aspect.

DESCRIPTION OF EMBODIMENTS

The following describes the technical solutions in embodiments of this application with reference to the accompanying drawings in embodiments of this application.

It is clear that the described embodiments are merely some rather than all of embodiments of this application.

Figure 1:
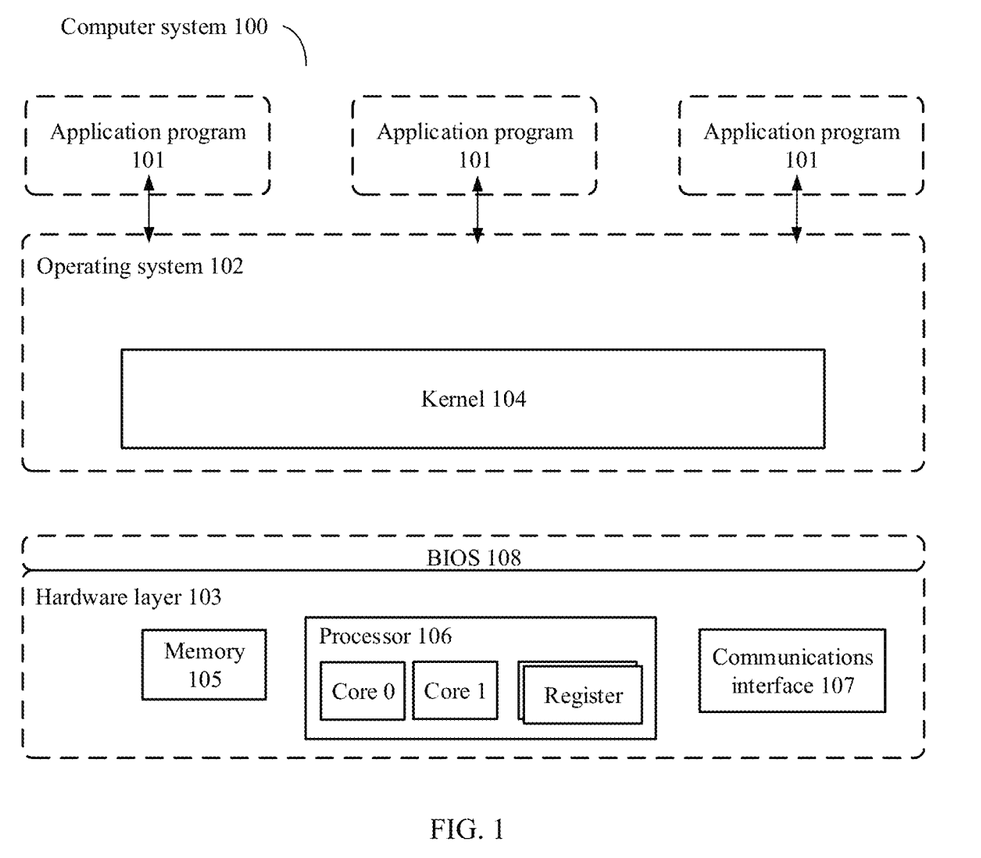
FIG. 1 is a diagram of a structure of a computer system 100 according to an embodiment of this application.

FIG. 1 is a schematic diagram of a structure of a computer system 100. The computer system 100 may include a software layer (not shown) and a hardware layer 103. The software layer includes one or more application programs 101 and an operating system 102, and the operating system 102 includes a kernel 104. The hardware layer 103 includes a processor 106, a memory 105, and a communications interface 107. The operating system 102 is system software for managing hardware and software resources.

The processor 106 is a control center of the computer system 100, and connects various components of the computer system 100 by using various interfaces and buses. In some embodiments, the processor 106 may include one or more processing units, or referred to as physical cores. For example, the processor 106 in FIG. 1 includes a core 0 and a core 1. The processor 106 may further include a register, and the register may be configured to store an address of a function of the kernel 104. The processor 106 may be a central processing unit (CPU). Alternatively, the processor 106 may be another general-purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor 106 may be any conventional processor or the like.

The memory 105 stores a computer program. The processor 106 is configured to execute the computer program in the memory 105, to implement a function defined by the computer program. The memory 105 is a non-volatile storage medium, and generally includes an internal memory and an external storage. The internal memory includes, but is not limited to, a random access memory (RAM), a read-only memory (ROM), a cache, or the like. The external storage includes, but is not limited to, a flash memory, a hard disk, an optic disc, a universal serial bus (USB) disk, or the like. The computer program is usually stored in the external storage. Before executing the computer program, the processor loads the program from the external storage to the internal memory. The memory 105 may be independent, and is connected to the processor 106 by using a bus. Alternatively, the memory 105 and the processor 106 may be integrated into a chip subsystem.

The communications interface 107 uses a transceiver apparatus such as a transceiver, to implement communication between the computer system 100 and another device or a communications network.

A BIOS 108 is firmware that performs hardware initialization in a power-on boot phase and provides a runtime service to the operating system. The firmware is a program fixed in hardware and is fixed in the hardware before the hardware is delivered. The BIOS is the first program to be executed after a physical machine is powered on.

Figure 2:
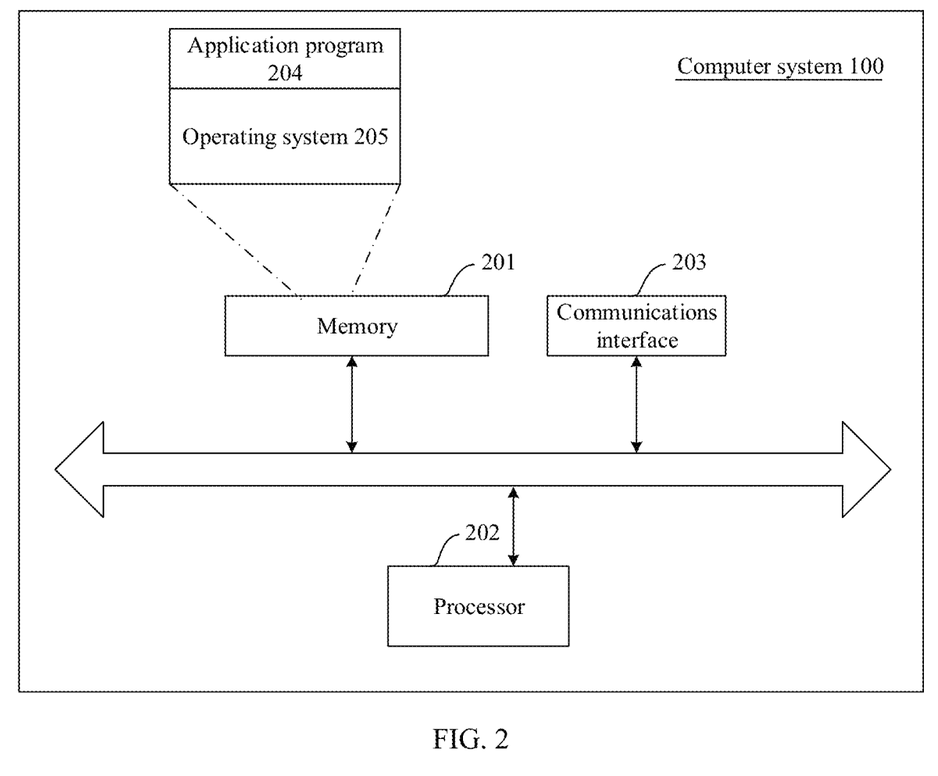
FIG. 2 is a diagram of a structure of a computer system 100 according to an embodiment of this application.

In an embodiment, the computer system 100 may be a physical device, such as a server or a terminal device. The terminal device may be a handheld device with a wireless connection function, or another processing device connected to a wireless modem, for example, may be a mobile phone, a computer, a tablet computer, a personal digital assistant (PDA), a mobile Internet device (MID), a wearable device, or an e-book reader, or may be a portable, pocket-sized, handheld, computer built-in, or vehicle-mounted mobile device. In this implementation, a schematic diagram of a structure of the computer system 100 is shown in FIG. 2.

The computer system 100 includes a memory 201, a processor 202, and a communications interface 203. The memory 201, the processor 202, and the communications interface 203 may be a part or a whole of the memory 105, the processor 106, and the communications interface 107 in FIG. 1 respectively. For embodiments of the memory 201, the processor 202, and the communications interface 203 in FIG. 2, refer to corresponding descriptions in FIG. 1. The memory 201 stores an operating system 205 and an application program 204, and may further store data generated by the operating system 205 and the application program 204 in a running process.

In another implementation, the computer system 100 may be a virtual computer. The virtual computer is a general term of running environments virtualized by software in all types of virtualization devices. The concept includes a virtual machine and a container. Virtualization is a core technology in cloud scenarios, in which a hardware resource is virtualized and shared in a plurality of users, so that the users can flexibly use a physical resource with security isolation, and utilization of the physical resource can be greatly improved.

When the computer system needs to be rebooted, if a reboot time is excessively long, user experience of a user is affected. Kernel version update is used as an example. In a scenario in which a version of a kernel (for example, the kernel 104 in FIG. 1) needs to be updated, and an old kernel is replaced with a new kernel, kexec may skip a phase of booting the BIOS and a phase of hardware initialization, and boot the currently running old kernel to the new kernel. Although kexec can save a time required for booting the BIOS and hardware initialization, a kernel reboot process still consumes a long time. The kernel reboot herein refers to a change from executing the old kernel to booting the new kernel. In the kexec mechanism, kernel reboot includes two time-consuming phases: power-off and power-on phases of a physical core.

The following describes power-off and power-on of a physical core in kernel reboot. A multi-core processor includes a plurality of cores. The core may also be referred to as a physical core, including a primary physical core (the core 0 in FIG. 1) and one or more secondary physical cores (the core 1 in FIG. 1). In a kernel reboot phase, some secondary physical cores need to be powered off and then powered on.

A power-off process is specifically as follows: After the kernel receives a computer reboot instruction (machine shutdown), the primary physical core serially sends an offline instruction to the secondary physical cores. For example, the primary physical core 0 sends the offline instruction to the secondary physical core 1. After receiving the offline instruction, the secondary physical core 1 sends the offline instruction to a secondary physical core 2. The secondary physical cores are sequentially notified in this way. After receiving the offline instruction, the secondary physical core enters a clear state (TEARDOWN) to clear a task on the secondary physical core, for example, disable an interrupt, suspend receiving a new task, or suspend a task being processed. Then, the secondary physical core is removed from the system and is no longer scheduled by the kernel. For the kernel, a state of the secondary physical core is an offline state. Finally, the secondary physical core is powered off. In this case, the state of the secondary physical core is a power-off state.

A power-on process is specifically as follows: When an instruction for instructing to boot the kernel is received, the secondary physical core changes from the power-off state to a power-on state, and performs hardware detection and program initialization after powered on. Then, the secondary physical core is booted to the kernel, the state of the secondary physical core is set to an online state, and initialization of the secondary physical core is started, for example, a load capability of the secondary physical core is detected, and hardware information of the secondary physical core is obtained. After initialization of the secondary physical core is completed, the kernel sets the state of the secondary physical core to an active state, and the secondary physical core in the active state may process a task and participate in process scheduling.

However, a time consumed to power off and then power on a single secondary physical core accounts for more than 70% of a time required by an entire kernel reboot process and accounts for more than 30% of a time required to reboot the computer system. In addition, because the secondary physical cores are notified serially, the reboot time further increases linearly as a quantity of physical cores increases.

Kernel reboot may include two phases: stopping executing a kernel and starting executing a kernel. The following uses a kernel version update scenario as an example to describe a kernel reboot method provided in this application. For the kernel update scenario, execution of an old kernel is stopped, and execution of a new kernel is started. It may be understood that, for a non-kernel update scenario, a kernel whose execution is stopped and a kernel whose execution is started are a same kernel.

Figure 3:
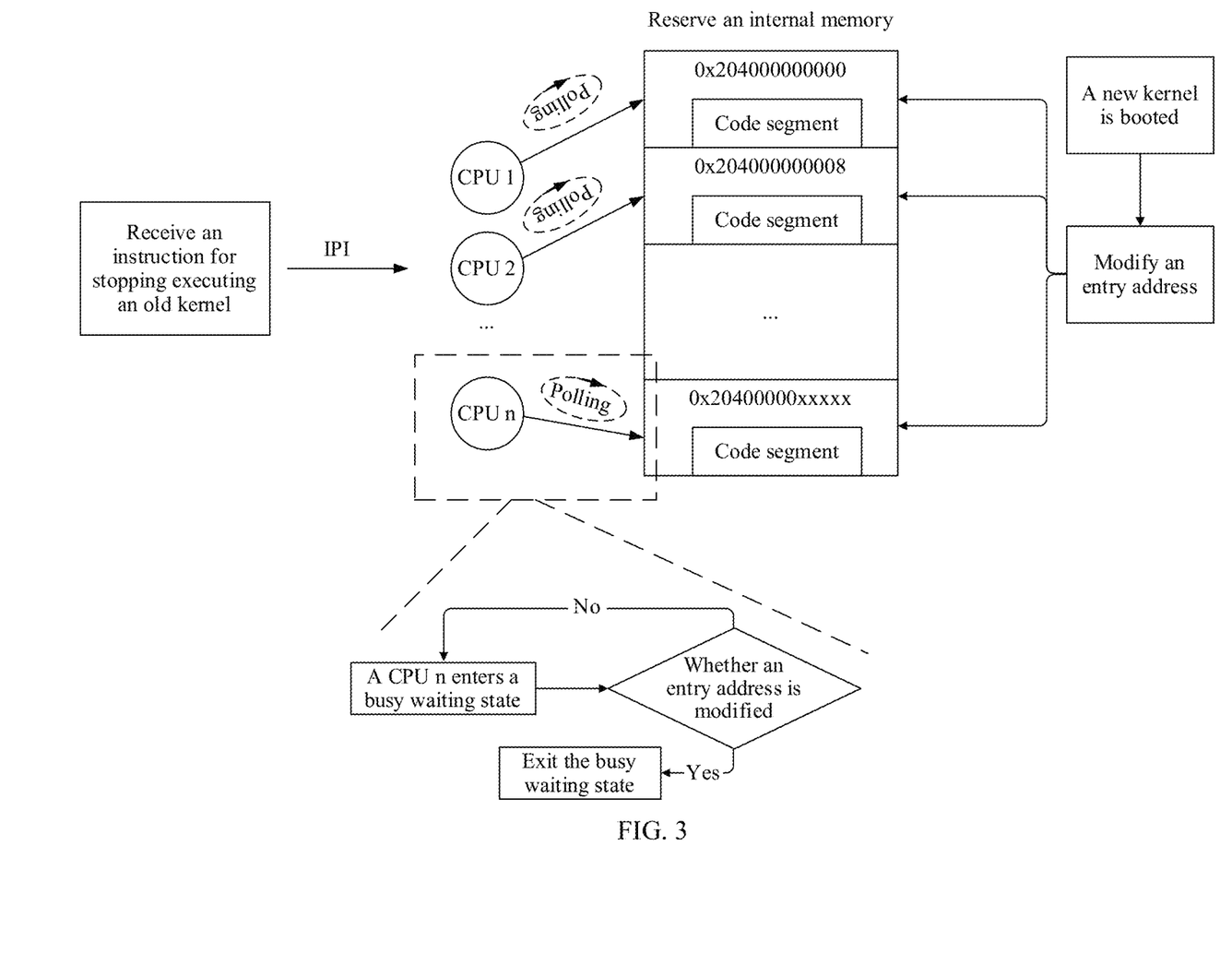
FIG. 3 is a schematic flowchart of kernel reboot according to an embodiment of this application.
Figure 4:
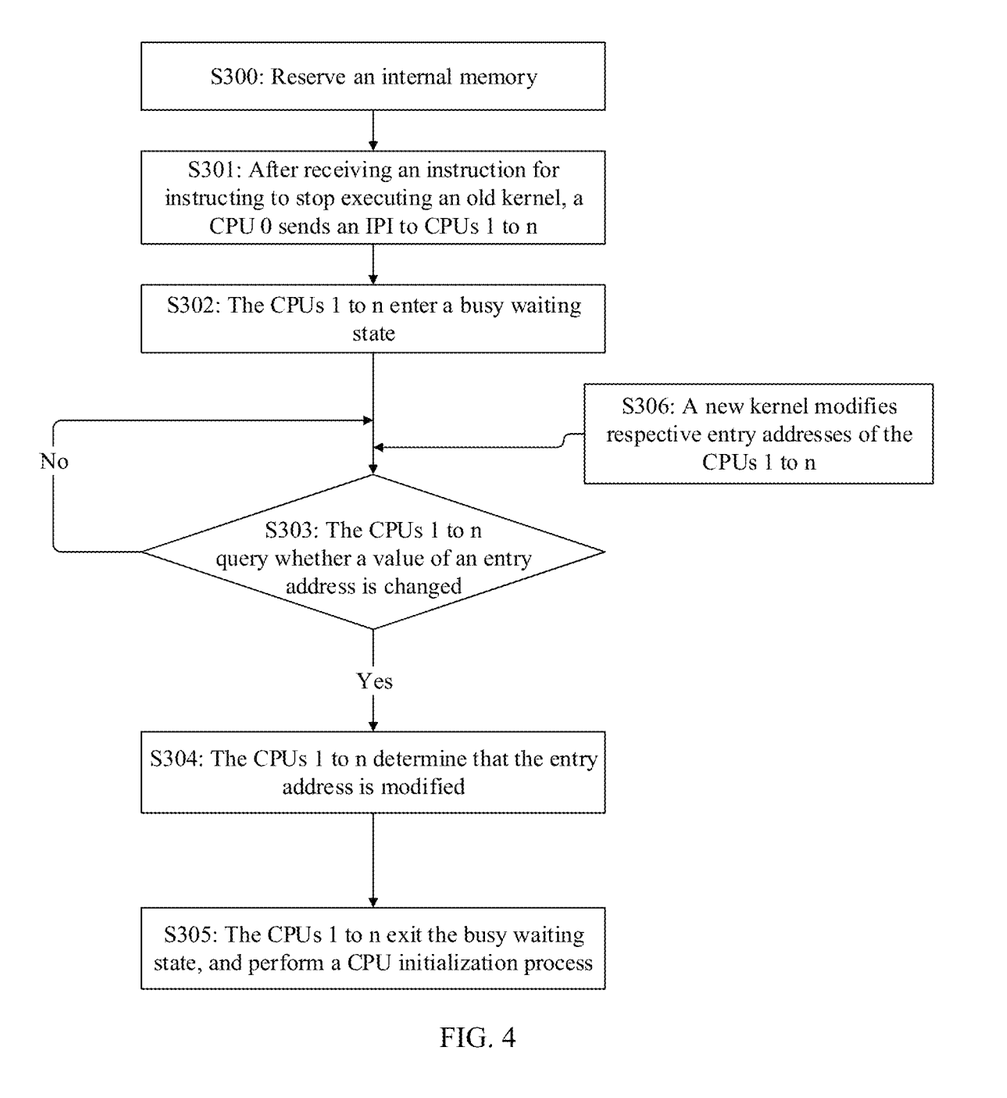
FIG. 4 is a schematic flowchart of kernel reboot according to an embodiment of this application.

As shown in FIG. 3, in a kernel reboot method provided in an embodiment of this application, after an instruction for stopping executing an old kernel is received, in response to a received interrupt, physical cores CPUs 1 to n enter a busy waiting state, and determine, through polling (periodic query), whether entry addresses are modified. When a new kernel is booted, the new kernel modifies the entry addresses of the physical cores to notify the physical cores that the new kernel has been booted. Therefore, when the physical cores CPUs 1 to n determine, through polling, that the entry addresses are modified, the physical cores exit the busy waiting state, perform an initialization operation, and receive task scheduling of the new kernel. As shown in FIG. 4, the kernel reboot method provided in this application specifically includes the following operations.

Operation S301: After receiving an instruction for instructing to stop executing an old kernel, a CPU 0 (primary physical core) sends an inter processor interrupt (IPI) to each other secondary physical cores (CPUs 1 to n in FIG. 3, where n is a positive integer).

The stopping executing the old kernel means that the old kernel no longer receives new scheduling, and a process being processed in the old kernel is suspended. Compared with a conventional technology in which an offline instruction is sent to physical cores serially, that is, the primary physical core sends the offline instruction to a secondary physical core, and then the secondary physical core sends the offline instruction to a next secondary physical core, in this application, the primary physical core sends the IPI to other secondary physical cores in parallel, so that the plurality of secondary physical cores can receive the interrupt instruction simultaneously or almost simultaneously, thereby saving a waiting time for sending the instruction serially, and shortening a time required for kernel reboot.

Operation S302: After receiving the interrupt, the plurality of physical cores CPUs 1 to n enter a busy waiting state.

The physical core enters the busy waiting state in response to the received interrupt. The physical core in the busy waiting state does not receive task scheduling, whose state in the kernel is an offline state. However, the physical core in the busy waiting state is still in a power-on state, which is not powered off as in the conventional technology.

Operation S303: The physical core queries whether a value of an entry address of the physical core in an internal memory is changed.

The physical core in the busy waiting state reads a code segment in the internal memory, program code stored in the code segment instructs the physical core in the busy waiting state to query whether an entry address corresponding to the physical core in the internal memory is changed, and each physical core queries, in the internal memory, whether an entry address of the physical core is changed.

Specifically, when entering the busy waiting state, the value of the entry address of the physical core is 0. If the physical core finds that the value of the entry address is not 0, it indicates that the value of the entry address of the physical core is changed. If the entry address of the physical core is not 0, it indicates that a new kernel is booted, the physical core needs to exit the busy waiting state, initialize the physical core, and receive task scheduling of the kernel.

In an embodiment, the physical core may periodically query for the entry address.

In an embodiment, in this embodiment of this application, the internal memory for storing the entry address may be a reserved internal memory. When the computer system performs internal memory allocation, an internal memory part may be reserved (S300) to store entry addresses of one or more physical cores and a code segment to be executed when the physical core enters the busy waiting state or exits the busy waiting state. The entry address is an entry address of the physical core, and is an initial address of the code segment. A code segment (code segment/text segment) is usually an internal memory area for storing program code. Each physical core has a respective corresponding entry address and code segment to be executed when the physical core enters or exits the busy waiting state. After kernel reboot, the physical core may jump to the entry address and execute program code stored in the code segment.

Operation S304: The physical core determines that the entry address is modified.

Operation S305: The physical core exits the busy waiting state, and performs an initialization procedure of the physical core.

If the entry address is modified, it indicates that a new kernel has been booted. The physical core needs to exit the busy waiting state, perform an initialization procedure of the physical core, and then receive task scheduling of the new kernel. If it is found that the entry address is modified when the physical core queries for the entry address, for example, the entry address is not 0, it indicates that the computer system enters a phase of booting the new kernel. In this case, the physical core exits the busy waiting state, and jumps to a modified entry address. The modified entry address is an initial address of a new code segment, and the new code segment is used to instruct the physical core to exit the busy waiting state, and perform an initialization procedure.

In an embodiment, before the querying whether an entry address is modified, this application further includes operation S306: After the new kernel is booted, the booted new kernel modifies respective entry addresses of the physical cores CPUs 1 to n. Modified entry addresses are initial addresses of new code segments, and code in the new code segments is used to instruct the physical cores to perform operation S305.

The initialization procedure of the physical core may include detecting a load capability of the physical core, obtaining hardware information of the physical core, and adding an identifier of the physical core to a non-uniform memory access architecture (NUMA).

Before operation S301, the method may further include reserving an internal memory (S300). Specifically, S300 may include the following operations.

Operation S300-1: When the system is booted, reserve an internal memory for each physical core in an internal memory allocation phase, and set an initial value of the internal memory to 0.

Operation S300-2: Zero-set a value of an entry address of the physical core in the reserved internal memory, and set a code segment in the reserved internal memory, where code in the code segment is used to instruct the physical core to query whether the value of the entry address is changed.

The entry address may be zero-set to prevent confusion between old and new addresses because the reserved internal memory is filled with a new entry address when a previous kernel is rebooted or a new kernel is booted.

Figure 5:
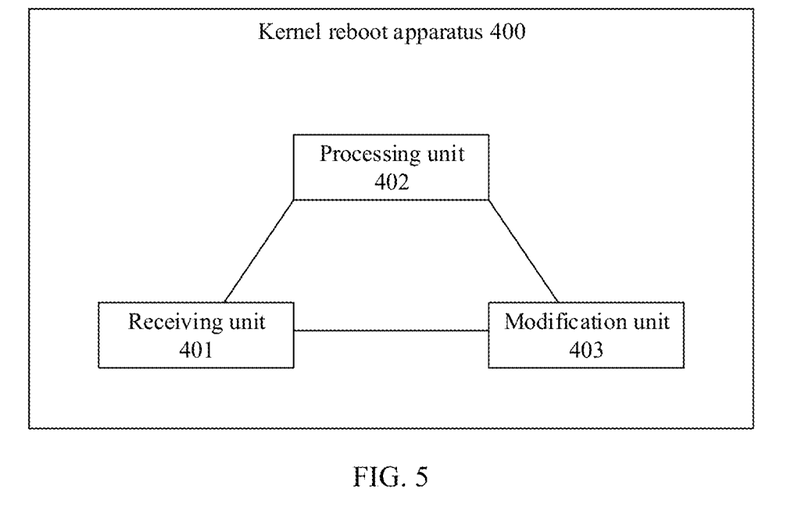
FIG. 5 is a schematic diagram of a kernel reboot apparatus according to an embodiment of this application.

FIG. 5 is a diagram of a structure of a kernel reboot apparatus 400 according to an embodiment of this application. The kernel reboot apparatus may be the computer system 100. Specifically, the kernel reboot apparatus 400 includes some functional units configured to implement the kernel reboot method described in FIG. 3 and FIG. 4:

a receiving unit, configured to receive a request to stop executing a kernel; and a processing unit, configured to set a state of a physical core to a busy waiting state; query whether an entry address of the physical core is modified, which is specifically instructing the physical core in the busy waiting state to query whether the entry address of the physical core is modified; set, after it is determined that the entry address of the physical core is modified, the state of the physical core to exit the busy waiting state; and perform an initialization procedure of the physical core.

In an embodiment, there are a plurality of physical cores, and the processing unit is specifically configured to: simultaneously send an interrupt to one or more physical cores in a processor in response to the received request; and set the state of the physical core to the busy waiting state in response to the received interrupt.

In an embodiment, there are a plurality of physical cores, and each of the one or more physical cores has a corresponding internal memory space for storing an entry address of the physical core.

In an embodiment, a code segment is further stored in the internal memory space corresponding to each physical core, and the processing unit is specifically configured to invoke an instruction in the code segment, to query whether the entry address of the physical core is modified.

In an embodiment, the kernel reboot apparatus further includes a modification unit, configured to: in response to the kernel being booted, modify the entry address of the physical core and the code segment in the internal memory space, where a modified entry address is a start address of a modified code segment, and an instruction of the modified code segment is invoked by the physical core to perform the initialization procedure of the physical core.

In an embodiment, the processing unit is specifically configured to: determine that the entry address of the physical core is modified, and jump to executing a code segment corresponding to a modified entry address, where the modified entry address is a start address of the code segment corresponding to the modified entry address, and an instruction of the code segment corresponding to the modified entry address is invoked by the physical core to perform the initialization procedure of the physical core.

An embodiment of this application further provides a computer system. The computer system includes a processor and a memory, the memory stores computer instructions, and the processor invokes the computer instructions to perform the kernel reboot method described in the foregoing embodiment.

An embodiment of this application further provides a computer-readable storage medium. The computer-readable storage medium stores computer instructions, and a processor invokes the computer instructions to perform the kernel reboot method described in the foregoing embodiment.

An embodiment of this application further provides a computer program product. The computer program product includes computer instructions, and a processor invokes the computer instructions to perform the kernel reboot method described in the foregoing embodiment.

In the specification, claims, and accompanying drawings of this application, the terms "first", "second", "third", "fourth" and the like are intended to distinguish between different objects but do not indicate a particular order. In addition, the terms "include", "have", and any other variant thereof are intended to cover non-exclusive inclusion. For example, a process, a method, a system, a product, or a device that includes a series of operations or units is not limited to the listed operations or units, but can further includes operations or units that are not listed, or can further includes another inherent operation or unit of the process, the method, the product, or the device. An "embodiment" mentioned in this specification means that a particular feature, structure, or feature described with reference to the embodiment may be included in at least one embodiment of this application. The phrase shown in various locations in the specification may not necessarily refer to a same embodiment, and is not an independent or optional embodiment exclusive from another embodiment. It is explicitly and implicitly understood by a person skilled in the art that embodiments described in the specification may be combined with another embodiment.

The terms such as "component", "module", and "system" used in this specification are used to indicate a computer-related entity, hardware, firmware, a combination of hardware and software, software, or software being executed. For example, a component may be, but is not limited to, a process that runs on a processor, a processor, an object, an executable file, a thread of execution, a program, and/or a computer. As shown in the figure, both an application that is running on the computing device and the computing devices may be components. One or more components may reside within a process and/or a thread of execution, and a component may be located on one computer and/or distributed between two or more computers. In addition, these components may be executed by various computer-readable media that store various data structures. The components may communicate by using a local and/or remote process and based on, for example, a signal having one or more data packets (for example, data from two components interacting with another component in a local system, a distributed system, and/or across a network such as the internet interacting with other systems by using the signal).

What is claimed is:

1. A kernel reboot method for a processor comprising a primary physical core and at least two secondary physical cores for loading a new kernel, comprising:

loading the new kernel by the primary core, and modifying in an internal memory of the primary core, entry addresses for the at least two secondary physical cores and a corresponding code segment to perform an initialization procedure for the at least two secondary physical cores;

receiving, by the at least two secondary physical cores, a request to stop executing an old kernel, wherein the request is sent from the primary physical core in parallel to the at least two secondary physical cores;

in response to receiving the request, setting a state of the at least two secondary physical cores to a busy waiting state;

querying and determining, by the at least two secondary physical cores in the busy waiting state, that the respective entry addresses of the at least two secondary physical cores are modified as compared to previous entry addresses of the at least two secondary physical cores; and setting, by the at least two secondary physical cores after determining that the respective entry addresses of the at least two secondary physical cores are modified, the state of the at least two secondary physical cores to exit the busy waiting state;

wherein exiting the busy waiting state comprises performing the initialization procedure of the at least two secondary physical cores by jumping to executing the code segment indicated by the respective modified entry addresses.

2. The method according to claim 1, wherein the setting a state of the at least two secondary physical cores to a busy waiting state comprises:

simultaneously sending an interrupt to the at least two secondary physical cores in the processor in response to the received request; and setting the state of the at least two secondary physical cores to the busy waiting state in response to the received interrupt.

3. The method according to claim 1, wherein each of the at least two secondary physical cores has a corresponding internal memory space for storing the respective entry address of the respective secondary physical core.

4. The method according to claim 3, wherein the code segment is further stored in the internal memory space corresponding to each secondary physical core, and the querying, by the at least two secondary physical cores in the busy waiting state, whether respective entry addresses of the at least two secondary physical cores are modified comprises:

invoking, by the at least two secondary physical cores, an instruction in the code segment, to query whether the respective entry addresses of the at least two secondary physical cores are modified.

5. The method according to claim 1, wherein setting, after it is determined that the respective entry addresses of the at least two secondary physical cores are modified, the state of the at least two secondary physical cores to exit the busy waiting state comprises:

determining that the entry address of the respective physical core is modified, and jumping to executing the code segment corresponding to a modified entry address, wherein the modified entry address is a start address of the code segment corresponding to the modified entry address, and an instruction of the code segment corresponding to the modified entry address is invoked by the respective physical core to perform the initialization procedure of the respective physical core.

6. A kernel reboot apparatus, comprising:
at least one processor comprising a primary physical core and at least two secondary physical cores for loading a new kernel; and
one or more memories coupled to the at least one processor and storing programming instructions for execution by the at least one processor to cause the apparatus to:
load the new kernel by the primary core, and modify in an internal memory of the primary core, entry addresses for the at least two secondary physical cores and a corresponding code segment to perform an initialization procedure for the at least two secondary physical cores;
receive, from the primary physical core, a request to stop executing an old kernel;
in response to receiving the request, set a state of the at least two secondary physical cores to a busy waiting state;
query and determine, by the at least two secondary physical cores in the busy waiting state, that the respective entry addresses of the at least two secondary physical cores are modified as compared to previous entry addresses of the at least two secondary physical cores; and
set, by the at least two secondary physical cores after determining that the respective entry addresses of the at least two secondary physical cores are modified, the state of the at least two secondary physical cores to exit the busy waiting state; wherein exiting the busy waiting state comprises perform the initialization procedure of the at least two secondary physical cores by jumping to executing the code segment indicated by the respective modified entry addresses.

7. The apparatus according to claim 6, wherein the programming instructions, when executed by the at least one processor, cause the apparatus to:
simultaneously send an interrupt to the at least two secondary physical cores in the processor in response to the received request; and set the state of the at least two secondary physical cores to the busy waiting state in response to the received interrupt.

8. The apparatus according to claim 6, wherein each of the at least two secondary physical cores has a corresponding internal memory space for storing the respective entry address of the respective secondary physical core.

9. The apparatus according to claim 8, wherein the code segment is further stored in the internal memory space corresponding to each secondary physical core, and the programming instructions, when executed by the at least one processor, cause the apparatus to invoke, by the at least two secondary physical cores, an instruction in the code segment, to query whether the respective entry addresses of the at least two secondary physical cores are modified.

10. The apparatus according to claim 6, wherein the programming instructions, when executed by the at least one processor, cause the apparatus to:
determine that the entry address of respective physical core is modified, and jump to executing the code segment corresponding to a modified entry address, wherein the modified entry address is a start address of the code segment corresponding to the modified entry address, and an instruction of the code segment corresponding to the modified entry address is invoked by the respective physical core to perform the initialization procedure of the respective physical core.

11. A non-transitory computer-readable storage medium, wherein the computer-readable storage medium stores computer instructions, and a processor executes the computer instructions to:
load a new kernel by a primary core, and modify in an internal memory of the primary core, entry addresses for at least two secondary physical cores and a corresponding code segment to perform an initialization procedure for the at least two secondary physical cores;
receive, by the at least two secondary physical cores of the processor, a request to stop executing an old kernel, wherein the request is sent from the primary physical core of the processor in parallel to the at least two secondary physical cores;
in response to receiving the request, set a state of the at least two secondary physical cores to a busy waiting state;
query and determine, by the at least two secondary physical cores in the busy waiting state, that the respective entry addresses of the at least two secondary physical cores are modified as compared to previous entry addresses of the at least two secondary physical cores; and
set, by the at least two secondary physical cores after determining that the respective entry addresses of the at least two secondary physical cores are modified, the state of the at least two secondary physical cores to exit the busy waiting state; wherein exiting the busy waiting state comprises perform the initialization procedure of the at least two secondary physical cores by jumping to executing the code segment indicated by the respective modified entry addresses.

12. The computer-readable storage medium according to claim 11, wherein the processor executes the computer instructions to:
simultaneously send an interrupt to the at least two secondary physical cores in the processor in response to the received request; and
set the state of the at least two secondary physical cores to the busy waiting state in response to the received interrupt.

13. The computer-readable storage medium according to claim 11, wherein each of the at least two secondary physical cores has a corresponding internal memory space for storing the respective entry address of the respective secondary physical core.

14. The computer-readable storage medium according to claim 13, wherein the code segment is further stored in the internal memory space corresponding to each secondary physical core, and the programming instructions, when executed by the at least one processor, cause the apparatus to invoke, by the at least two secondary physical cores, an instruction in the code segment, to query whether the respective entry addresses of the at least two secondary physical cores are modified.

15. The computer-readable storage medium according to claim 11, wherein the processor executes the computer instructions to:
determine that the entry address of respective physical core is modified, and jump to executing the code segment corresponding to a modified entry address, wherein the modified entry address is a start address of the code segment corresponding to the modified entry address, and an instruction of the code segment corresponding to the modified entry address is invoked by the respective physical core to perform the initialization procedure of the respective physical core.

\* \* \* \* \*